US006609812B2

(12) United States Patent
Machi et al.

(10) Patent No.: US 6,609,812 B2
(45) Date of Patent: Aug. 26, 2003

(54) DUAL MODE VISIBLE AND INFRARED LIGHTHEAD

(75) Inventors: Nicolo F. Machi, Springfield, OH (US); Michael D. Burton, Miamisburg, OH (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/932,342

(22) Filed: Aug. 17, 2001

(65) Prior Publication Data

US 2002/0075679 A1 Jun. 20, 2002

Related U.S. Application Data

(60) Provisional application No. 60/257,184, filed on Dec. 20, 2000.

(51) Int. Cl.[7] .................................................. F21V 9/00
(52) U.S. Cl. ...................... 362/231; 362/240; 362/241; 362/373; 362/259
(58) Field of Search ................................. 362/230, 231, 362/236, 247, 800, 240, 241, 294, 373, 259

(56) References Cited

U.S. PATENT DOCUMENTS

| | | | |
|---|---|---|---|
| 3,555,264 A | 1/1971 | Schimmelpfennig | 240/3.1 |
| 3,703,635 A | 11/1972 | Burkarth | 240/44.1 |
| 3,771,123 A | 11/1973 | Lanes | 340/104 |
| 4,353,110 A | 10/1982 | Ellis | 362/35 |
| 4,578,575 A | 3/1986 | Roos | 250/203 |
| 4,709,305 A * | 11/1987 | McMahan et al. | 362/519 |
| 4,947,291 A | 8/1990 | McDermott | 362/19 |
| 5,142,458 A | 8/1992 | Brunson | 362/194 |
| 5,142,467 A | 8/1992 | Yuen | 352/399 |
| 5,228,770 A | 7/1993 | Brunson | 362/194 |
| 5,633,710 A | 5/1997 | Kumra | 356/139.08 |
| 5,695,272 A * | 12/1997 | Snyder et al. | 362/231 |
| 5,871,272 A | 2/1999 | Sharrah | 362/184 |
| 5,947,590 A | 9/1999 | Meuse | 362/264 |
| 5,984,494 A * | 11/1999 | Chapman et al. | 362/470 |
| 5,997,163 A | 12/1999 | Brown | 352/553 |
| 6,019,482 A | 2/2000 | Everett | 362/184 |
| 6,142,649 A * | 11/2000 | Beghelli | 362/259 |
| 6,367,949 B1 * | 4/2002 | Pederson | 362/240 |

FOREIGN PATENT DOCUMENTS

| | | | | |
|---|---|---|---|---|
| WO | WO 00/37314 | 6/2000 | | B64D/47/02 |

* cited by examiner

*Primary Examiner*—Sandra O'Shea
*Assistant Examiner*—Ali Alavi
(74) *Attorney, Agent, or Firm*—Larry L. Palguta

(57) ABSTRACT

A dual mode visible and infrared lighthead (100) for use as a landing light or searchlight. The dual mode lighthead incorporates a modular design wherein at least one visible light source (200) and at least one infrared diode (302) are mounted into the rear sector (128) of a housing (102). Visible or infrared light is emitted out of the front sector (122) of the housing (102). Lenses (308) are installed onto the front sector (122) of housing (102) and sealed to protect the interior of the lighthead (100) from the elements.

17 Claims, 4 Drawing Sheets

DUAL MODE VISIBLE AND INFRARED LIGHTHEAD

BACKGROUND OF THE INVENTION

This application claims the benefit of U.S. Provisional Application No. 60/257,184 filed Dec. 20, 2000 entitled DUAL MODE VISIBLE AND INFRARED LIGHTHEAD.

FIELD OF THE INVENTION

This invention relates to dual-mode visible and infrared lighting. Specifically, this invention relates to a dual mode visible and infrared lighthead for use with aircraft landing lights and searchlights, and for use with other vehicles.

DESCRIPTION OF THE RELATED ART

Aircraft generally have landing lights mounted thereon to provide illumination during taxi, take-off, and landing when visibility is reduced by darkness or adverse weather conditions. Landing lights may be mounted in a fixed position on the aircraft; alternatively, the landing lights may be pivotable by drive means to extend from the aircraft when needed, and retracted to reduce drag when not in use. Searchlights are pivotable by drive means similar to landing lights, but include an additional capability to rotate up to 360 degrees in a plane perpendicular to the extend-retract plane. Military and law enforcement helicopters commonly use searchlights to aim a beam of light in a desired direction to illuminate targets.

With the advent of infra-red based Night Vision Imaging Systems ("NVIS") for covert operations, there arose a need for landing lights and searchlights that were compatible with NVIS by producing infrared light for illuminating the selected landing and search areas while eliminating visible light. Early NVIS-compatible landing and search lights used infrared light filters installed over conventional visible lighting systems. A disadvantage of early NVIS-compatible lighting systems was that the flight crew could not switch from visible to NVIS modes during a mission, since the infrared filters were required to be installed and removed while the aircraft was on the ground. This disadvantage was overcome by prior dual mode lightheads containing both visible and infrared lighting elements, such as Snyder, et al. U.S. Pat. No. 5,695,272. Dual mode lightheads allow the flight crew to switch between visible and infrared lighting modes by simply applying electrical power to either the infrared or visible portions of the dual mode lighthead as desired.

While prior dual mode lightheads offer significant advantages over early manually-installed filters, they suffer from several disadvantages. First, replacement of failed lamps is a cumbersome and difficult process owing to the segmented lens and filter assembly, which must be removed then re-sealed each time a lamp is replaced. This repair frequently causes damage to the reflectors, reducing the optical efficiency of the lighthead. In addition, dual mode lightheads typically emit lower light intensity than dedicated infrared or visible lighting systems, since the surface area on the lighthead available for the lighting system is divided between the visible and infrared portions. Further, prior dual mode lightheads utilize visible light sources coupled with infrared filters to produce the infrared light, generating high temperatures within the lighthead that can limit the life of the light elements, lenses, and sealing materials. There is a need for a dual mode lighthead that is easier to maintain, provides higher intensity light output, and operates at a lower temperature to extend component life.

SUMMARY OF THE INVENTION

This invention is directed to a dual mode lighthead that is easier to re-lamp, provides improved light output, and generates less heat as compared to prior dual mode lightheads.

Specifically, the present invention is a modular design incorporating a housing, preferably a cast aluminum housing. The housing is designed to accommodate installation of the lighting elements from the rear of the lighthead. This prevents contamination of the reflector with dirt, oil, or fingerprints that can reduce the optical efficiency of the reflector. Installing the lighting elements from the rear also reduces maintenance time, since the front lens does not have to be removed and then re-sealed.

Replacement of prior front-mounted halogen lamps involves grasping the glass envelope of the lamp to install it into a socket. Because the presence of contaminating agents such as dirt, oil and fingerprints on the lamp's glass envelope can reduce the life of the lamp, maintenance personnel must use cotton gloves or other protective materials when replacing lamps. The present invention utilizes a visible light source that includes a base that allows maintenance personnel to handle and install the lamp from the rear of the lighthead without touching or otherwise contaminating the glass envelope. Further, the lamp base allows the visible light source to be easily installed and removed without the need for tools.

The invention also utilizes high intensity infrared diodes in contrast to the filtered visible light sources used in prior lightheads. High intensity infrared diodes offer increased infrared light emission along with higher efficiency, reduced power consumption, longer life, and reduced heat generation. The high intensity infrared diodes also facilitate faster and simpler replacement due to their modular design.

The present invention comprises a dual mode lighthead, comprising: a housing comprising front, rear, top, and bottom sectors; an attachment point connected with one of said sectors of said housing to connect the dual mode lighthead with means for positioning the lighthead; means for reflecting light mounted inside said housing, said means positioned to reflect light from the front sector of said housing; at least one high intensity infrared diode, said diode being installed into said housing from the rear sector of said housing and positioned to emit infrared light out of the front sector of said housing; at least one visible light source, said visible light source being installed into said housing from the rear sector of said housing such that said visible light source projects through said reflectors and emits light from the front sector of said housing; and at least one lens affixed to the front sector of said housing through which one of emitted visible and infrared light passes.

These and other features will become better understood with reference to the following description, appended claims, and accompanying drawings.

DETAILED DESCRIPTION OF THE INVENTION

Figure 1:
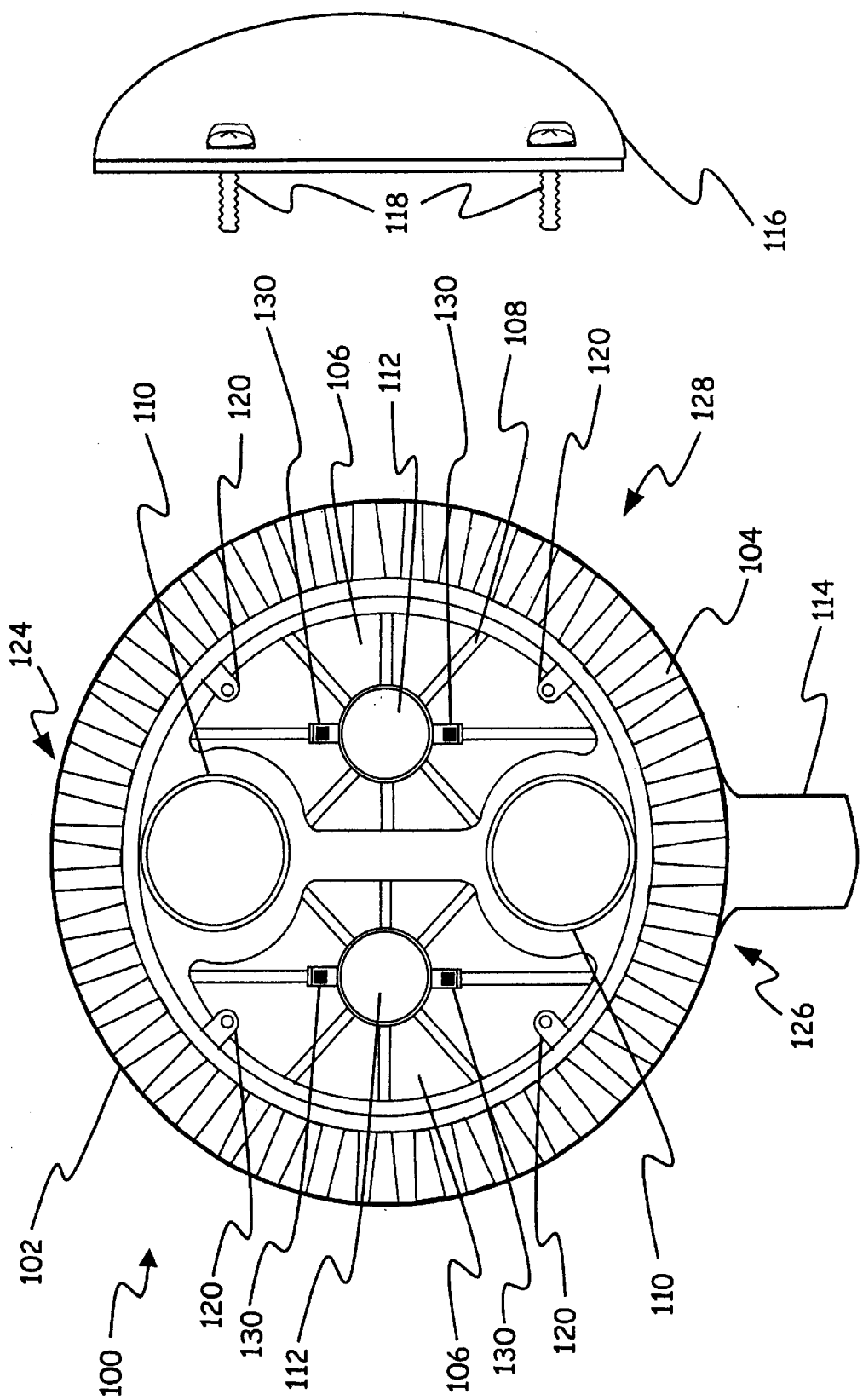
FIGS. 1-*a* and 1-*b* are views of the back and cover of the dual mode lighthead.

A view of the back side of the dual mode lighthead 100 is shown in FIG. 1. Dual mode lighthead 100 includes a housing 102 having a rear sector 128, a top sector 124, and a bottom sector 126. Housing 102 also includes a front sector 122, shown in FIG. 3 and discussed below. Housing 102 is comprised of a cast or machined material, preferably aluminum, and may optionally include a plurality of cooling fins 104 to aid in the dispersion of heat generated by the light sources. Housing 102 further includes the parabolic reflector cavities 106 shaped to optimize the optical design for the visible light portion of lighthead 100 wherein the visible light is emitted from the front sector 122 of housing 102. Lamp retainer slots 130 are cast or machined into the reflector cavities 106 to facilitate installation of the visible light sources 200, discussed in greater detail below. Cavities 106 may also optionally include a plurality of heat-sink ribs 108 to help carry away heat generated by the visible light sources. The openings 110 accommodate the infrared light sources, and the openings 112 accommodate the visible light sources of lighthead 100. An attachment point 114 is affixed to the bottom sector 126 of housing 102 and facilitates mounting of lighthead 100 directly to the aircraft structure, or optionally to the pivot means of a landing light or searchlight. A rear cover 116 protects the interior of lighthead 100 from the elements, being secured with a plurality of screws 118 to the receptacles 120.

Figure 2:
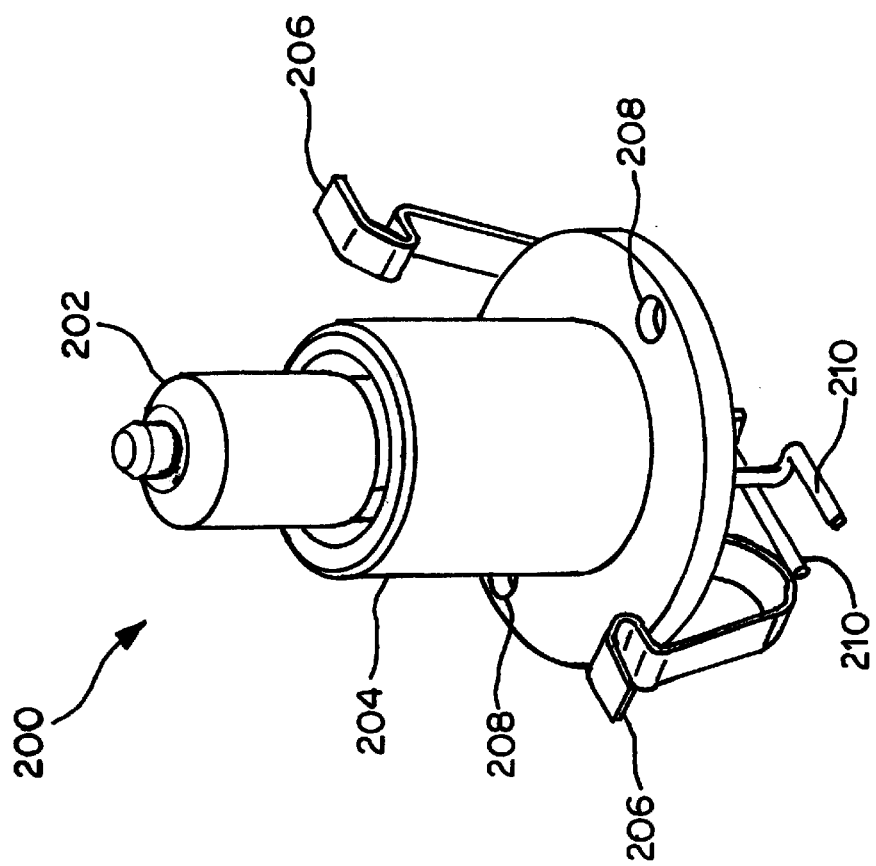
FIG. 2 is a view of the visible light source.

The visible light source 200 is shown in FIG. 2. An incandescent lamp 202, preferably halogen, is affixed to a lamp base 204. The lamp base 204 provides a convenient surface for handling the visible light source 200 without contaminating the lamp 202. One or more retaining springs 206 are attached to the lamp base 204 by conventional means such as rivets 208. The lamp leads 210 facilitate connection of electrical power to the lamp 202.

Figure 3:
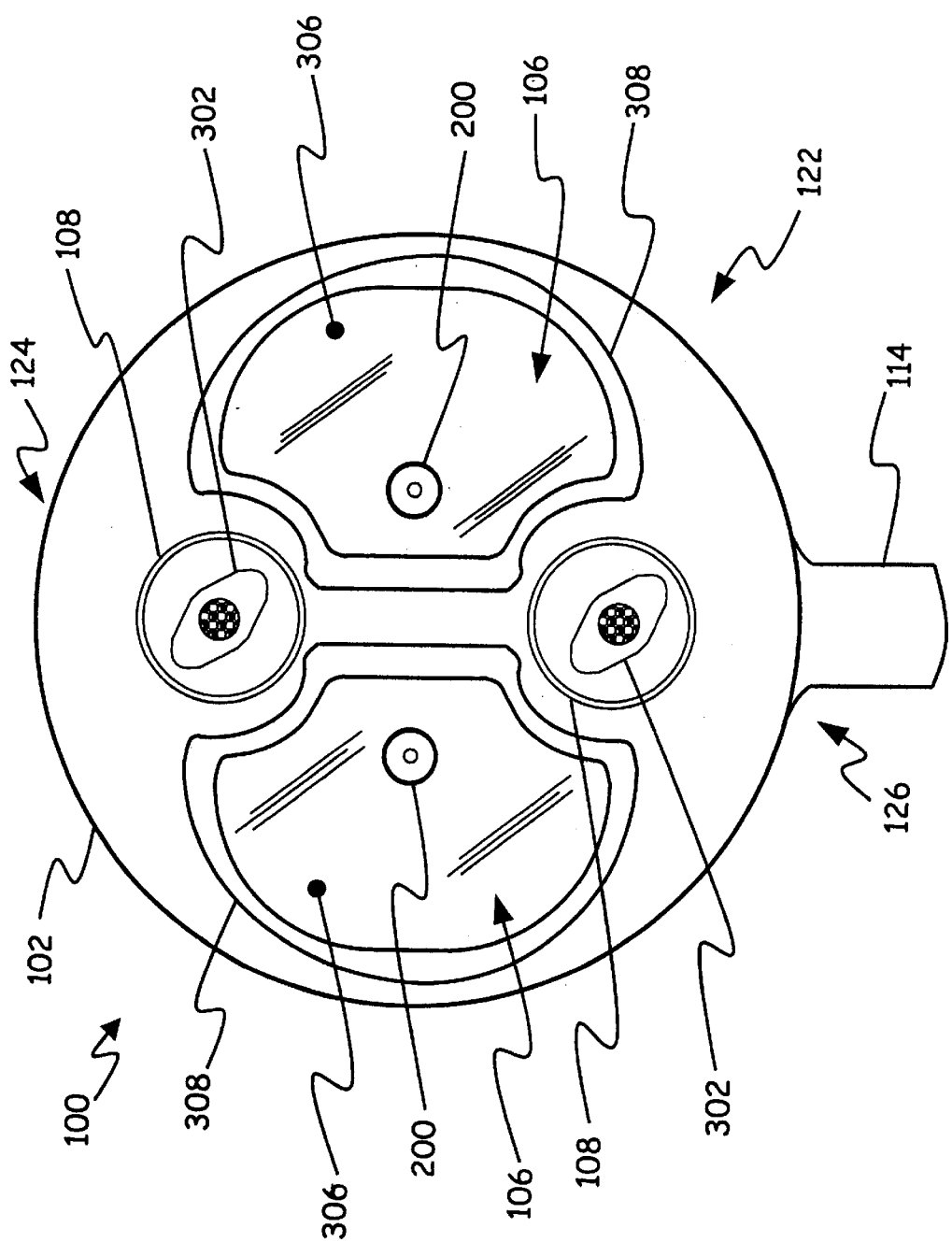
FIG. 3 is a view of the front of the dual mode lighthead.

The front of lighthead 100 is shown in FIG. 3. Referring to FIGS. 1, 2 and 3, the infrared light sources 302, preferably high intensity infrared diodes, are installed into openings 110 from the rear sector 128 of housing 102 and facing toward the front sector 122. The visible light sources 200, preferably halogen lamps, are installed into openings 112 from the rear sector 128 of housing 102 and facing toward the front sector 122 of housing 102. As each visible light source 200 is pressed through an opening 112 of housing 102, the retaining springs 206 spread and then snap into the lamp retainer slots 130, firmly holding the visible light source 200 in place. The cast aluminum reflectors 306 are installed into cavities 106 to optimize light emission from visible light sources 200. The lenses 308 are installed onto the front sector 122 of housing 102 and sealed to protect the interior of lighthead 100 from the elements. The attachment point 114 is affixed to the bottom sector 126 of housing 102 and facilitates mounting of lighthead 100 directly to the aircraft structure, or optionally to the pivot mechanism of a landing light or searchlight.

Figure 4:
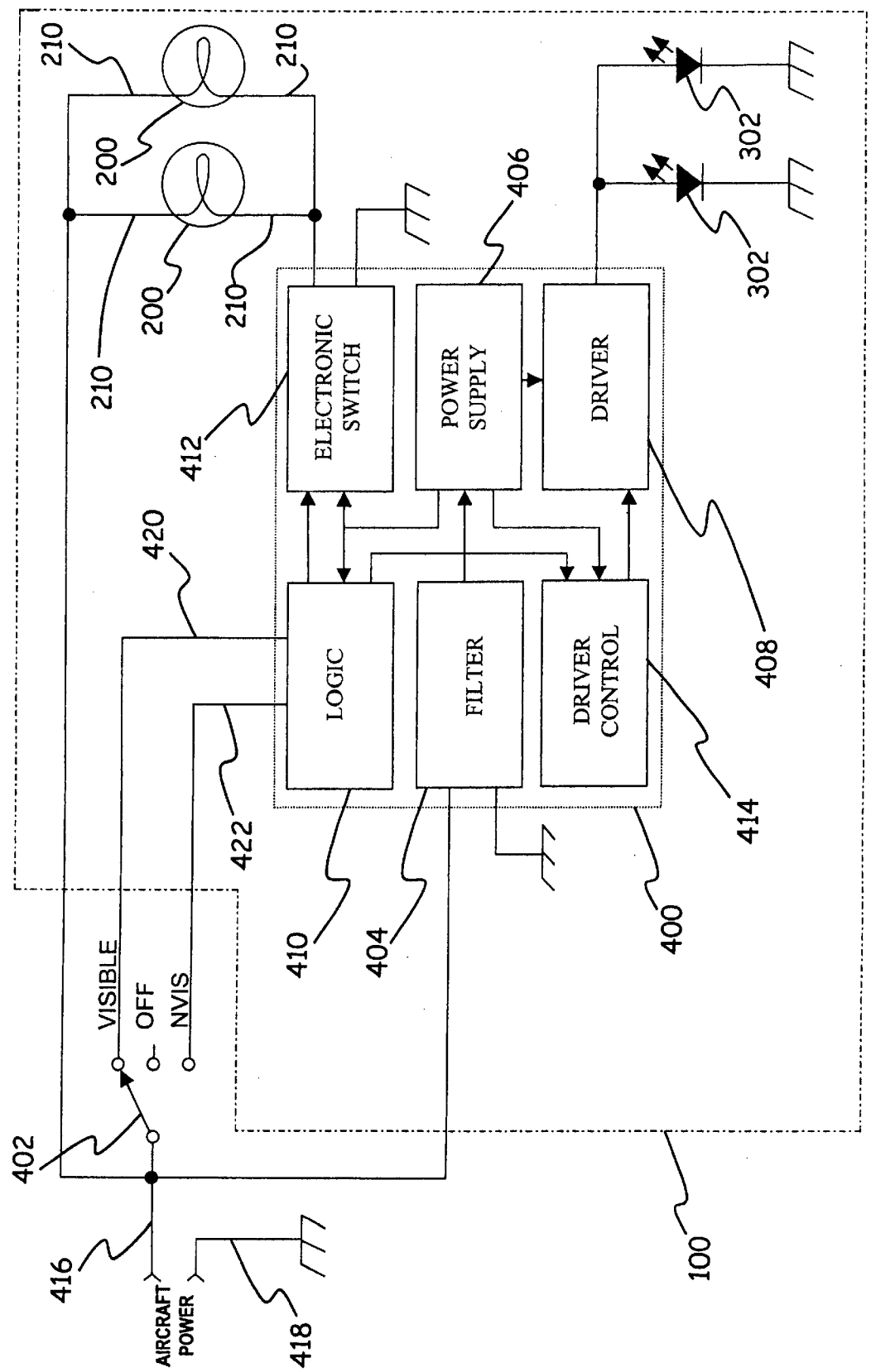
FIG. 4 is an electrical schematic of the dual mode lighthead.

As shown in FIG. 4, electrical power for the dual mode lighthead is supplied by the power input lines 416, 418. Electrical power is controlled by a switch 402, which provides logical electrical input signals to the logic circuit 410 of the control circuit 400 via the logic lines 420, 422. If logic circuit 410 detects the presence of an electrical voltage on the "visible" logic line 420, the electronic switch 412, such as a power metal oxide semiconductor field effect transistor (MOSFET), is activated, causing the visible light sources 200 to emit visible light. If logic circuit 410 detects the presence of an electrical voltage on the "NVIS" logic line 422, the driver control 414 activates the driver 408. The driver 408, such as an electrical current limiter, supplies a controlled amount of electrical current to the infrared light sources 302, causing the infrared light sources 302 to emit infrared light. The logic circuit 410 turns off both the visible light sources 200 and the infrared light sources 302 when no voltage is detected on either of the logic lines 420, 422. The logic circuit 410 also turns off both the visible light sources 200 and the infrared light sources 302 if an illegal logic condition exists, such as voltage present on both logic lines 420, 422. The high-voltage protection filter 404 isolates electrical noise between the aircraft and the control circuit 400. The power supply 406, such as a voltage regulator, conditions the power from the aircraft to a voltage level suitable for the components in control circuit 400.

In operation, the dual mode lighthead is mounted to a fixed or retractable landing light mechanism, or a searchlight mechanism. A control switch 402, located in the cockpit, is typically in the "Off" position causing electrical power to be removed from both the visible lamps 200 and the infrared light sources 302. When the operator sets control switch 402 to the "visible" position, electronic switch 412 is activated, applying power to the visible light sources 200 and causing them to emit a bright visible light. If the operator places switch 402 in the "NVIS" position, driver 408 is actuated, causing the infrared light sources 302 to emit infrared light to facilitate searching, targeting, and landing during covert operations.

Although the present invention has been shown and described herein with reference to a particular embodiment for a particular application, the present invention is not limited to aviation uses. Indeed, the present invention is immediately applicable to hand-held and stationary fixtures as well as all types of vehicular traffic, including automotive, marine, and railroad.

What is claimed is:

1. A dual mode lighthead, comprising:
a housing comprising front, rear, top, and bottom sectors;
an attachment point connected with one of said sectors of said housing to connect the dual mode lighthead with means for positioning the lighthead;
means for reflecting light mounted inside said housing, said means positioned to reflect light from the front sector of said housing;
at least one high intensity infrared diode, said diode being installed into said housing from the rear sector of said housing and positioned to emit infrared light out of the front sector of said housing;
at least one visible light source, said visible light source being installed into said housing from the rear sector of said housing such that said visible light source projects through said reflectors and emits light from the front sector of said housing; and
at least one lens affixed to the front sector of said housing through which one of emitted visible and infrared light passes.

2. The dual mode lighthead of claim 1, further including means for carrying away heat generated by said visible light source and said infrared diode.

3. The dual mode lighthead of claim 1, further including means for controlling the electrical power applied to said visible light source and said infrared diode.

4. The dual mode lighthead of claim 3 wherein said control means is one of located inside said housing and located remotely from said housing structure.

5. The dual mode lighthead of claim 1, further including a detachable cover affixed to the rear sector of said lighthead.

6. The dual mode lighthead of claim 1 wherein said visible light source further includes means for handling and installing the visible light source without contaminating the visible light source or contaminating said means for reflecting light.

7. A dual mode lighthead, comprising:

a housing comprising front, rear, top, and bottom sectors;

an attachment point connected with one of said sectors of said housing to connect the dual mode lighthead with means for positioning the lighthead;

means for reflecting light mounted inside said housing, said means positioned to reflect light from the front sector of said housing;

at least one high intensity infrared diode, said diode being installed into said housing from the rear sector of said housing and positioned to emit infrared light out of the front sector of said housing;

at least one visible light source, said visible light source being installed into said housing from the rear sector of said housing such that said visible light source projects through said reflectors and emits light from the front sector of said housing;

at least one lens affixed to the front sector of said housing through which one of emitted visible and infrared light passes;

means for carrying away heat generated by said visible light source and said infrared diode; and means for controlling the electrical power applied to said visible light source and said infrared diode.

8. A dual mode lighthead, comprising:

a housing comprising front, rear, top, and bottom sectors;

an attachment point connected with one of said sectors of said housing to connect the dual mode lighthead with means for positioning the lighthead;

means for reflecting light mounted inside said housing, said means positioned to reflect light from the front sector of said housing;

at least one high intensity infrared diode, said diode being installed into said housing from the rear sector of said housing and positioned to emit infrared light out of the front sector of said housing;

at least one visible light source wherein said visible light source includes means for handling and installing the visible light source without contaminating the visible light source or contaminating said means for reflecting light, said visible light source being installed into said housing from the rear sector of the housing such that the visible light source projects through said reflectors and emits light from the front sector of the housing;

at least one lens affixed to the front sector of said housing through which one of emitted visible and infrared light passes;

means for carrying away heat generated by said visible light source and said infrared diode;

means for controlling the electrical power applied to said visible light source and said infrared diode wherein said control means is one of located inside said housing and located remotely from said housing structure; and a detachable cover affixed to the rear sector of said lighthead.

9. A process for providing a dual mode lighthead, comprising:

providing a housing comprising front, rear, top, and bottom sectors;

providing said housing with an attachment point connected with one of said sectors of said housing to connect the dual mode lighthead with means for positioning the lighthead;

locating inside said housing means for reflecting light, said means positioned to reflect light from the front sector of said housing;

providing at least one high intensity infrared diode, said diode being installed into said housing from the rear sector of said housing and positioned to emit infrared light from the front sector of said housing;

providing at least one visible light source, said visible light source being installed into said housing from the rear sector of said housing such that said visible light source projects through said reflectors and emits light out of the front sector of said housing; and locating at least one lens at the front sector of said housing through which one of emitted visible and infrared light passes.

10. A process for providing a dual mode lighthead, comprising:

providing a housing comprising front, rear, top, and bottom sectors;

providing said housing with an attachment point connected with one of said sectors of said housing to connect the dual mode lighthead with means for positioning the lighthead;

locating inside said housing means for reflecting light, said means positioned to reflect light from the front sector of said housing;

providing at least one high intensity infrared diode, said diode being installed into said housing from the rear sector of said housing and positioned to emit infrared light from the front sector of said housing;

providing at least one visible light source, said visible light source being installed into said housing from the rear sector of said housing such that said visible light source projects through said reflectors and emits light out of the front sector of said housing;

locating at least one lens at the front sector of said housing through which one of emitted visible and infrared light passes;

providing means for carrying away heat generated by said visible light source and said infrared diode; and providing means for controlling the electrical power applied to said visible light source and said infrared diode.

11. A process for providing a dual mode lighthead, comprising:

providing a housing comprising front, rear, top, and bottom sectors;

providing said housing with an attachment point connected with one of said sectors of said housing to connect the dual mode lighthead with means for positioning the lighthead;

locating inside said housing means for reflecting light, said means positioned to reflect light from the front sector of said housing;

providing at least one high intensity infrared diode, said diode being installed into said housing from the rear sector of said housing and positioned to emit infrared light from the front sector of said housing;

providing at least one visible light source wherein said visible light source includes means for handling and installing the visible light source without contaminating the visible light source or contaminating said means for reflecting light, said visible light source being installed into said housing from the rear sector of the housing such that the visible light source projects through said reflectors and emits light from the front sector of the housing;

locating at least one lens at the front sector of said housing through which one of emitted visible and infrared light passes;

providing means for carrying away heat generated by said visible light source and said infrared diode;

providing means for controlling the electrical power applied to said visible light source and said infrared diode wherein said control means is one of located inside said housing and located remotely from said housing structure; and locating a detachable cover at the rear sector of said housing.

12. The dual mode lighthead of claim 1, wherein said housing includes at least one retainer mechanism for engaging with a retaining element of said visible light source as said visible light source is installed through an opening in said housing from the rear sector of said housing.

13. The dual mode lighthead of claim 7, wherein said housing includes at least one retainer mechanism for engaging with a retaining element of said visible light source as said visible light source is installed through an opening in said housing from the rear sector of said housing.

14. The dual mode lighthead of claim 8, wherein said housing includes at least one retainer mechanism for engaging with a retaining element of said visible light source as said visible light source is installed through an opening in said housing from the rear sector of said housing.

15. The process of claim 9, wherein, for said step of providing at least one visible light source, a retaining element of said visible light source engages with a retainer mechanism of said housing as said visible light source is installed through an opening in said housing from the rear sector of said housing.

16. The process of claim 10, wherein, for said step of providing at least one visible light source, a retaining element of said visible light source engages with a retainer mechanism of said housing as said visible light source is installed through an opening in said housing from the rear sector of said housing.

17. The process of claim 11, wherein, for said step of providing at least one visible light source, a retaining element of said visible light source engages with a retainer mechanism of said housing as said visible light source is installed through an opening in said housing from the rear sector of said housing.

\* \* \* \* \*